April 30, 1968 F. G. BOOTHE, JR., ET AL 3,380,331
APPARATUS FOR SECTIONING MOVING ARTICLES
Filed April 6, 1966 4 Sheets-Sheet 1

April 30, 1968   F. G. BOOTHE, JR., ETAL   3,380,331
APPARATUS FOR SECTIONING MOVING ARTICLES
Filed April 6, 1966   4 Sheets-Sheet 2

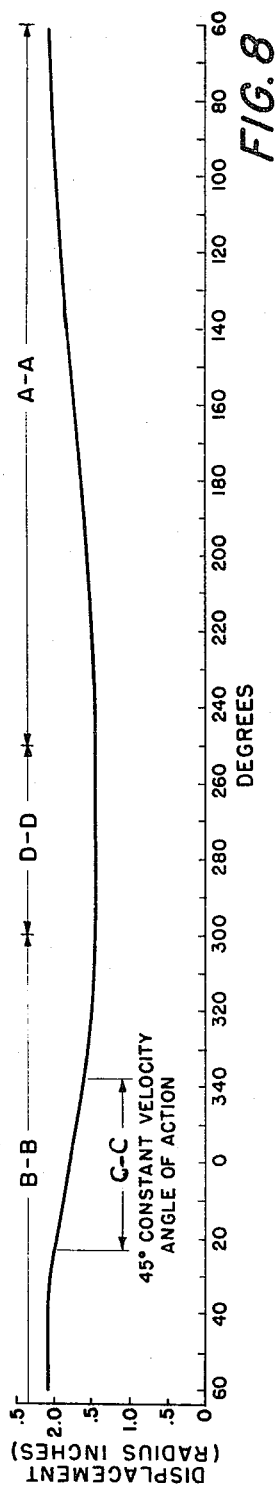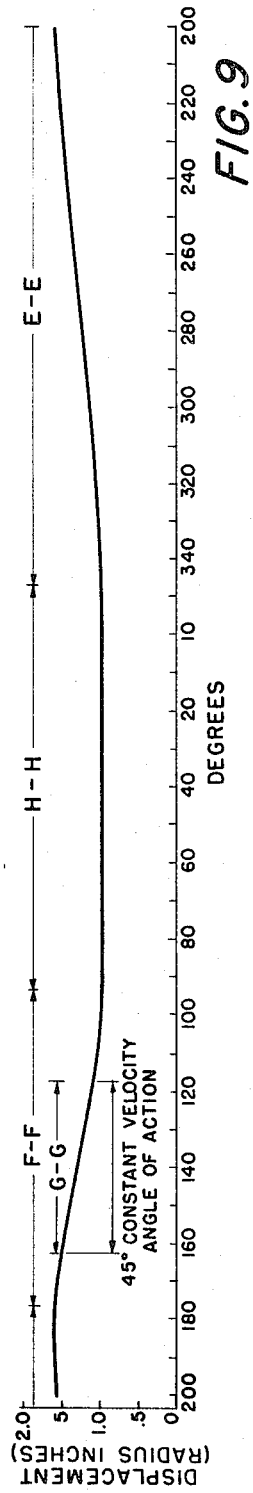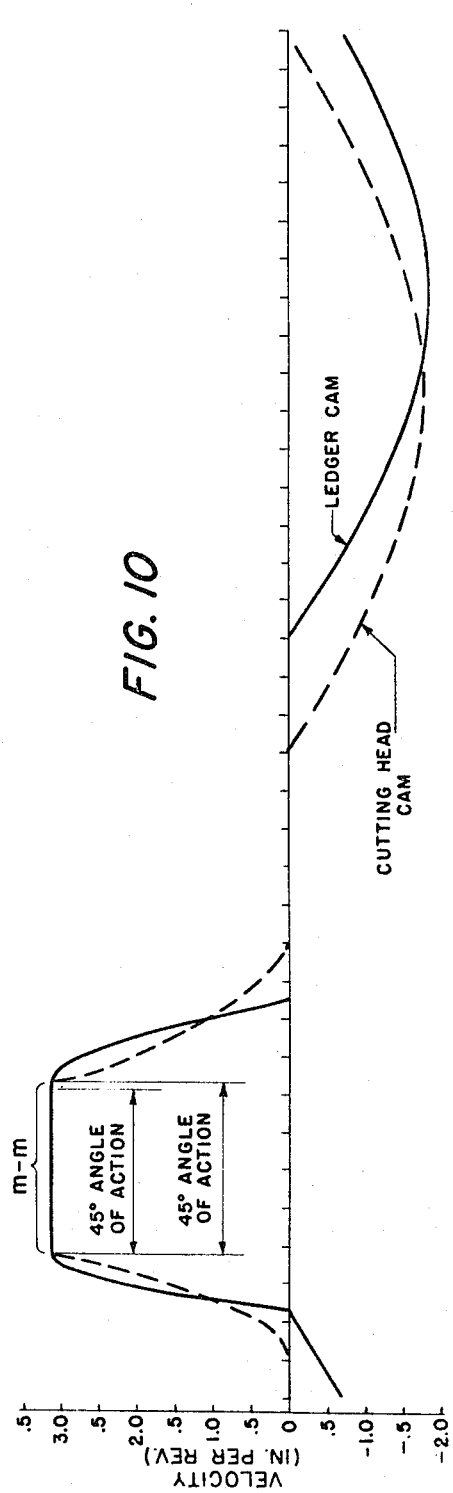

United States Patent Office 3,380,331
Patented Apr. 30, 1968

3,380,331
APPARATUS FOR SECTIONING MOVING ARTICLES
Floyd G. Boothe, Jr., and George L. Mathe, Richmond, Va., assignors to Philip Morris Incorporated, New York, N.Y., a corporation of Virginia
Filed Apr. 6, 1966, Ser. No. 540,583
11 Claims. (Cl. 83—338)

ABSTRACT OF THE DISCLOSURE

Apparatus suited for cutting a continuous length article advancing in a fixed longitudinal course at uniform speed into sections of predetermined length in which a rotary cutter disc and spindle to which it is fixed are mounted slidably in one arm of a plural arm rotor element rotatable in a plane transverse to the fixed longitudinal course, the sliding movement being in a path parallel with said course. Each complete rotation of the rotor element bodily revolves the cutter disc and its spindle in a predetermined circular path adapted to move the cutter disc into and out of cutting contact with the article. Concurrently the rotary cutter disc and spindle are reciprocated one cycle with each rotor element rotation, the longitudinal speed of the cutter disc and spindle during actual cutting being the same as that of the article. A clamping device is provided to hold the article during cutting and is reciprocated in timed relation with the reciprocating movement of the cutter disc, the longitudinal speed of the clamping device during the time the article is actually being cut being the same as that of the article and the cutter disc.

This invention is concerned with cutting apparatus, particularly apparatus for cutting an article into sections of predetermined length while the article is advancing along a fixed longitudinal course at a uniform speed. The apparatus is particularly useful for cutting an article of continuous length, as for example, a continuous length of rod, pipe, tubing and the like into sections of predetermined length as the article comes off the manufacturing line.

It is known in the art to utilize high speed manufacturing machinery for manufacturing in continuous operations, articles such as conduits, paper straws, seamless tubing and the like, the production capacities of the machinery being such that they may involve article speeds of hundreds of feet per minute. While high production speeds are advantageous from the standpoint of economy they give rise to special problems respecting cutting the continuous article into sections of individual article lengths, particularly as to the quality of cut possible with known art cutting devices. Thus, if the ends of the sections are required to be exactly perpendicular with the longitudinal axis of the section, means must be provided to insure that the cutter moves along in unison with the advancing article in order to cut perpendicularly transversely of the article course at all times during the cutting period. Furthermore, it may also be necessary to clamp or otherwise hold the article during the actual periods of cutting to preclude its rotating about its own axis and thereby prevent marring the quality of the cut. Means must then be provided to give the clamp a concurrent movement following that of the cutter during the time it is holding the article.

The apparatus of the present invention is characterized by its including a rotary cutter which may be rotated at a high speed in a plane transverse to the article course and which follows the movement of the article in such a manner that no longitudinal relative movement exists therebetween during actual cutting. The cutter is carried by a suitable support which in turn is mounted on a shaft fixed to rotate about an axis parallel with the article course. In this manner, the rotary cutter may be revolved bodily in a circular path about the fixed axis with the path passing adjacent the article course thereby moving the cutter into and out of cutting contact with the article once during each bodily revolution thereof. In view of the high speed with which the continuous article leaves the machinery on which it is formed, it is necessary to advance the cutter along with the article at least during the actual cutting period to insure that the cut made in the article is effected perpendicularly transversely of the longitudinal axis of the article. The foregoing is accomplished by providing a suitable cam arrangement which is adapted to reciprocate the rotary cutter longitudinally of the article course simultaneously with the revolution of the rotary cutter about the fixed axis. The cam is designed with a special profile including a section thereof which imparts to the rotary cutter a longitudinal speed during the time the cutter is in actual cutting contact with the article equal to the speed of the advance of the article along its course. The apparatus may also include a clamp means in the form of a ledger mechanism which is adapted to hold the article against rotation about its own axis during the time the rotary cutter is actually passing therethrough. Since the rotary cutter and the article both advance at equal longitudinal speeds during cutting, it is necessary that the ledger mechanism be actuated to hold the article and that it also move at the same uniform speed of advance during that time. Thus, means in the form of another cam arrangement are provided to reciprocate the ledger mechanism in concurrent timed relation with the reciprocating movement of the rotary cutter.

According to the invention, means also may be provided for independently rotating the rotary cutter at a very high speed about its axis of rotation independently of the means used for revolving bodily the cutter about the fixed axis.

Various other objects, features and advantages of the present invention will be made apparent by the description that follows and the illustrative examples depicted in the drawings. The invention accordingly comprises the apparatus embodying the features of construction, and combination and relation of parts which will be exemplified in the cutter apparatus hereinafter described and the scope of the invention will be indicated in the claims.

In the accompanying drawings:

FIGURE 8 is a diagrammatic representation of the cam profile of the cam used for imparting reciprocating motion to the rotary cutter.

FIGURE 9 is a diagrammatic representation of the cam profile of the cam used for imparting reciprocating motion to the ledger mechanism.

FIGURE 10 is a graphical representation of the period of motion of the cams illustrated in FIGURES 8 and 9 showing the portions of the advance stroke motion of each when a uniform velocity equal to that of the advancing article is imparted by the cams to the rotary cutter and ledger mechanism respectively.

Throughout the description like reference numerals are used to denote like parts in the drawings.

Figure 1:
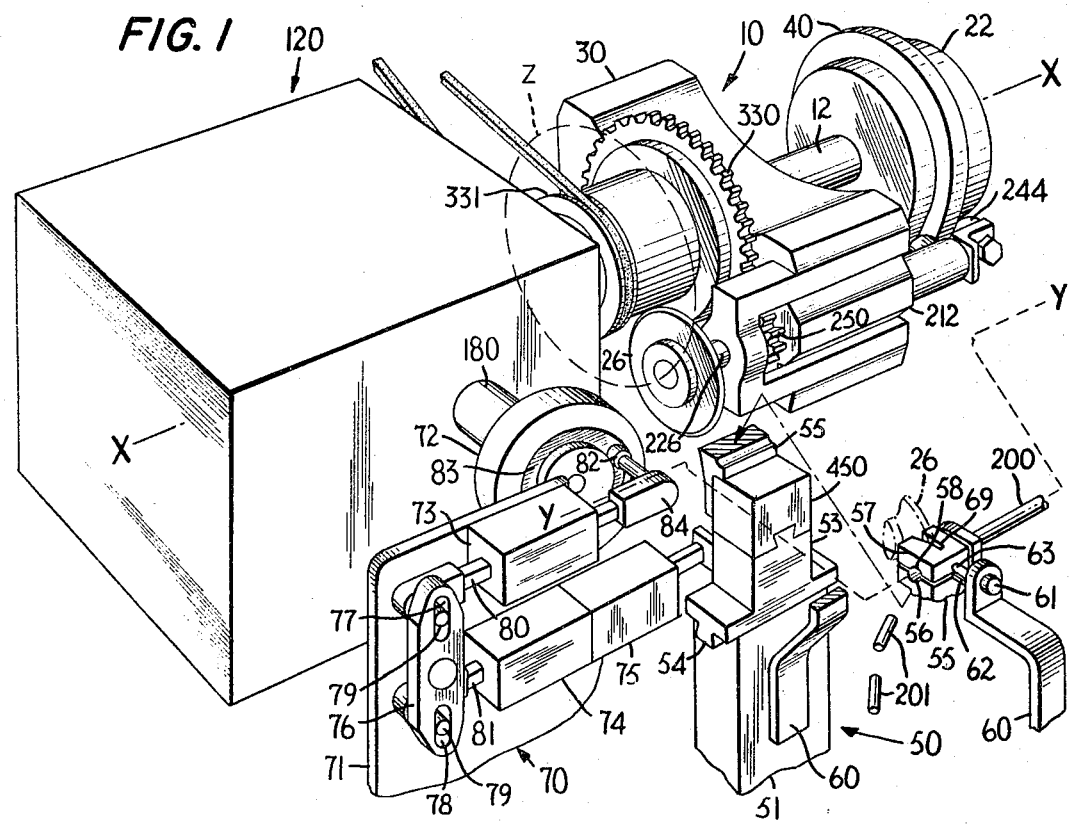
FIGURE 1 is a perspective view on reduced scale of the cutting apparatus of the present invention, certain parts being shown in an exploded position for purposes of clarity and illustration, the apparatus being shown with the rotary cutter in a cutting position cutting through an article of continuous length advancing along a fixed longitudinal course.

The cutting apparatus shown in the drawings and described herein is a representative embodiment suitable for use for cutting cigarette filter plugs from a continuous stock of filter rod produced on automatic filter manufacturing equipment. Those skilled in the art will readily discern its adaptability for sectioning other continuous articles comprised of various materials and including but not limited to both solid and hollow bodied continuous articles, such as drinking straws, light seamless metal tubing, solid rod material etc. In practice, the cutting apparatus may be conveniently located at the exit end of the manufacturing machinery with which the article is produced. In general, the article will issue therefrom in continuous form being advanced along a fixed longitudinal course calculated to lead it through the cutting apparatus of the present invention.

Referring to the drawings and particularly FIGURE 1, the apparatus comprises a number of components which for convenience of description will be referred to hereinafter as a cutter assembly 10, a ledger mechanism 50, a reciprocating drive assembly 70 for reciprocating the ledger mechanism, and a drive unit 120 for powering both the cutter assembly and the reciprocating drive assemblies.

Figure 2:
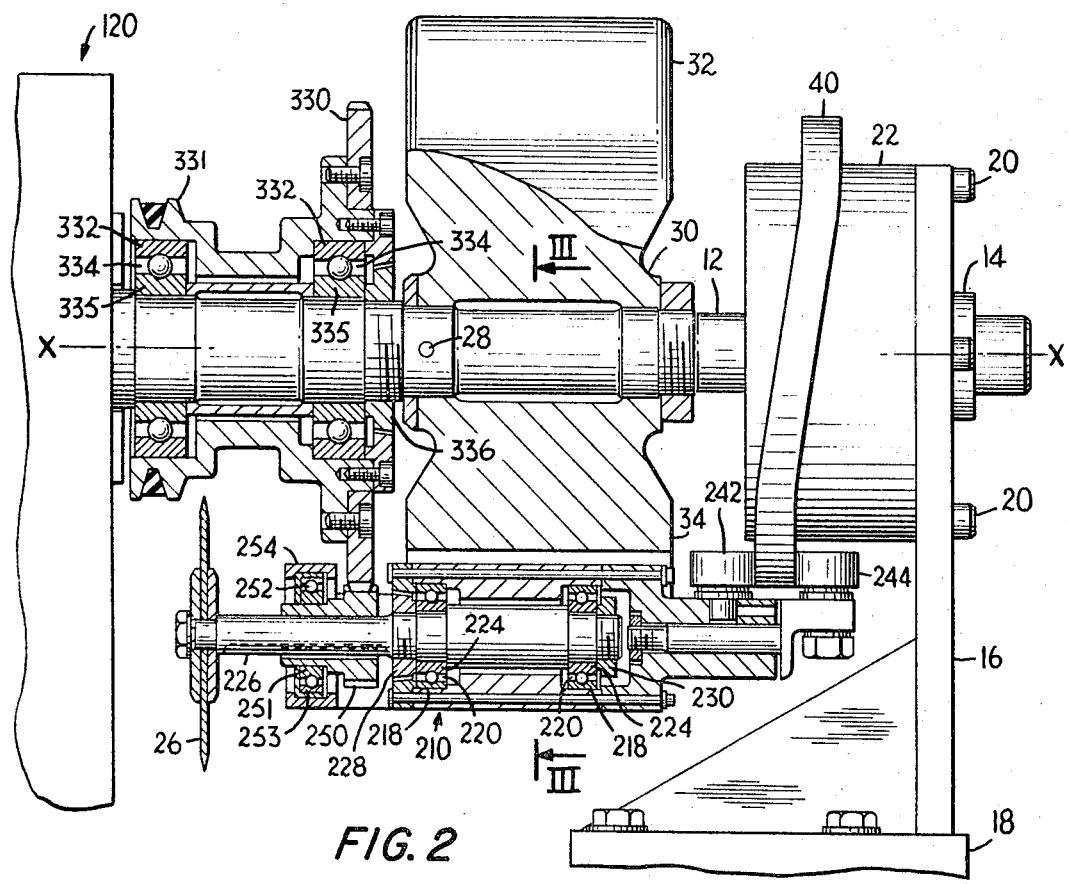
FIGURE 2 is a front elevational view partly in section of the cutter assembly comprising part of the apparatus of the present invention.
Figure 3:
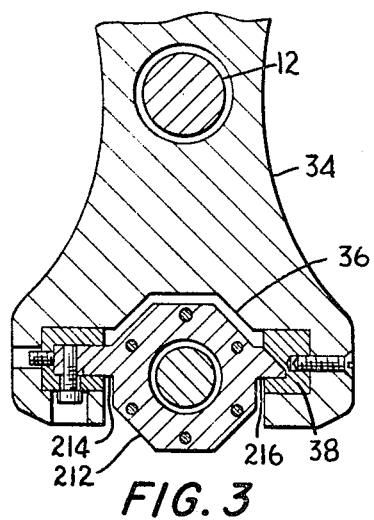
FIGURE 3 is a sectional view as taken along line III—III in FIGURE 2 and illustrates in detail the manner in which the rotary cutter is supported for simultaneous movement slidably longitudinally of the article course and revolution bodily about a fixed axis parallel to said course.
Figure 4:
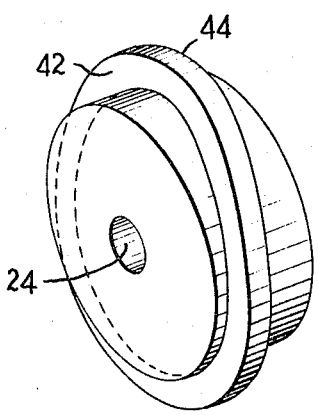
FIGURE 4 is a perspective view of the cam utilized for imparting reciprocating movement to the rotary cutter.

The cutter assembly 10, which is shown in greater detail in FIGURES 2 and 3 includes a main drive shaft 12 which at one end is connected with and driven by the drive unit 120, the main drive shaft extending into the drive unit as shown and having its axis of rotation X—X fixed parallel spaced with the fixed longitudinal course Y—Y along which the continuous article 200 advances (FIG. 1). The drive unit 120, the specific constructional details of which are not shown, may be one of a variety of power output devices as for example, an electric motor-gear transmission combination suited to deliver separate output speeds to the main drive shaft 12 and a shaft 180 for driving the reciprocating drive assembly 70. Control of the drive unit may be by conventional means. The other end of the main drive shaft 12 is supported in a bearing 14 carried by an upright support bracket 16 fixed to a base plate 18 mounted on a suitable frame member (not shown). For convenience, the frame member may be an extension of the framing of the article forming machinery, or it can be a separate structure located adjacent said machinery and providing a single support means for the entire cutting apparatus. The article forming machinery is not shown in the drawings as the construction of various types thereof is well known to those skilled in the art. The skilled artisan will, however, discern the convenience of disposing the cutter assembly at a location adjacent to and in line with the forming machinery. Also fixed to the support bracket 16 by means of screws 20 or like fasteners is a cam 22 which is arranged concentric with the fixed axis X—X of main drive shaft 12 and extends circularly therearound. Main drive shaft 12 extends through the body of the cam 22, a suitable opening 24 being provided in the cam for that purpose. The function of the cam 22 is to impart reciprocating motion to the rotary cutter member 26 and its more specific details of construction will be described later on in the description.

Mounted on the main drive shaft 12 and fixed therewith by means of taper pins 28 so as to rotate therewith is a rotor element 30 having at least two lobes or radially directed arms 32, 34, the general cross sectional shape of which may be best seen in FIGURE 3 wherein it will be noted the inner portions of the arms 32, 34 are relatively narrow with the arms flaring curvingly outwardly in the direction of the outer ends. The outer end of one of the radial arms 34 is provided with an enlarged slotted opening 36 extending longitudinally of the arm and parallel to the fixed axis X—X of main drive shaft 12 and wherein is fixedly supported the structure 38 of a slideway in which may be slidably mounted the rotary cutter spindle assembly 210 now to be described.

The rotary cutter spindle assembly 210 includes an outer sleeve member 212 having any convenient outer peripheral shape and which is provided on opposite sides with longitudinally extending wings 214, 216 having each wedge surfaces as shown to adapt them to mate with similar shaped surfaces formed in the slideway structure 38. Thus, it will be noted that the outer sleeve 212 is fixed against rotation within the radial arm 34, but it is free to slide longitudinally in radial arm 34 of rotor element 30 and hence is slidable longitudinally of the main drive shaft 12 and parallel with the longitudinal course Y—Y in which the article 200 is advancing. The sleeve 212 carries therein the fixed outer race elements 218 of a pair of bearing assemblies 220, 222, the inner races 224 of which are fixed to a cutter spindle 226, thereby making the cutter spindle 226 rotatable about its own axis independently of the movement of the rotor element 30. The cutter spindle 226 is, however, prevented from moving longitudinally within the outer sleeve 212, its longitudinal positioning therein being fixed by means of the lock nuts 228, 230. The sharpened and keenly honed cutter disc 26 fixed to one end of cutter spindle 226 is adapted to rotate therewith in a plane transverse to the course Y—Y in which the article advances. From the foregoing, it will be seen then that the cutter spindle 226 is supported to be bodily revolved about the fixed axis X—X of the main drive shaft 12 when said drive shaft is rotated. The path of revolution Z described by the cutter spindle when it is bodily revolved about the fixed axis X—X shown in FIGURE 1 in dashed lines is such that it passes closely adjacent the course Y—Y traversed by the advancing article. The closest adjacency of path Z and the course Y—Y is less than the radius of the cutter disc 26 and thus provides that the cutter disc 26 is moved into and out of cutting contact with the article 200 once each time the main drive shaft 12 is rotated.

Simultaneous with the revolution bodily of the cutter spindle 226 in path Z around the fixed axis X—X it is reciprocated longitudinally of its own axis, this motion being effected by the cam member 22 now described. Cam member 22 is a ribbon-type cam having a circular ribbon 40 extending therearound. The ribbon 40 of the cam is of uniform thickness and is provided with faces 42, 44 at opposite sides thereof the contour of which vary longitudinally of the fixed axis X—X of the main drive shaft and constitute the profile of the cam. The cam profile, illustrated diagrammatically in FIGURE 8, is designed so as to transmit reciprocating motion, in this case to reciprocate the rotary cutter spindle assembly 210 and hence cutter disc 26 one cycle longitudinally of the article course Y—Y as the cutter spindle 226 bodily revolves one revolution about the fixed axis X—X of main drive shaft 12. This reciprocating motion is transmitted to the rotary cutter spindle assembly 210 by a cam follower means which in a preferred form comprise a pair of follower rollers 242, 244, rotatably mounted on the sleeve member 212 and contacting the faces 42, 44 of the cam ribbon 40 as best seen in FIGURE 2.

A further understanding of the cutter assembly will appear from the description of the manner in which it operates. The drive unit 120 is arranged to drive the main drive shaft 12 so that it rotates once each time the continuous article 200 advances a distance equal to the predetermined section length, for example 80 mm., into which the article is being cut. Simultaneous with each revolution of the main drive shaft 12, the rotary cutter spindle assembly 210 will be bodily revolved one revolution about the fixed axis X—X, and it also will be reciprocated one cycle parallel to the article course Y—Y. It will be appreciated by those skilled in the art that if the article 200 is to be cut into sections 201 while it is advanced along a fixed longitudinal course Y—Y at a uniform speed, the cutter disc 26 will likewise have to be advanced in a parallel longitudinal course at the same uniform speed at least during the time the cutter disc is in actual cutting contact with the article to insure that a perpendicularly transverse cut is made therein.

The speed at which the main drive shaft 12 rotates is a function of the length of the sections 201 being cut from the continuous article as well as the speed at which the article is advancing. Thus, if sections each 80 mm. long are to be cut from a continuous article advancing at a uniform speed of 100 meters/minute, the main drive shaft will have to be rotated at a speed of 1250 r.p.m., the r.p.m. varying directly with the quantity of sections being cut per minute and being easily controlled in known manner.

On the other hand, it is recognized that the rotary cutter spindle 226 and the cutter disc 26 fixed thereto should generally rotate at a relatively constant cutting r.p.m. to cut through the material comprising the article with consistency, regardless of the number of sections being cut per minute, this optimum cutting r.p.m. being a function of the type of material from which the article is made. Thus, it is desirable to provide a means for driving the rotary cutter spindle 226 which is independent of the control of the drive means 120 connected with the main drive shaft 12 and functioning independently of the speed of the latter. To that end, the independent drive means for driving the rotary cutter spindle 226 may comprise a drive gear 330 mounted loosely on main drive shaft 12 but being fixedly connected with a pulley 331 which is also mounted loosely on the main drive shaft 12, the drive gear 330 and pulley 331 forming a unit free to rotate independently of the rotation of the main drive shaft. In one form of mounting, the drive gear 330 and pulley 331 are carried by the outer races 332 of bearing assemblies 333 and 334, the inner races 335 of the bearing assemblies being fixed to main drive shaft 12 as shown. The unit comprised of the drive gear and pulley while free to rotate about the main drive shaft is fixed against axial movement by a lock nut 336. The drive pulley 331 may be connected with a suitable driving means (not shown) by a belt or similar transmission device (not shown). The drive gear 330 meshes with a pinion gear 250 fixed to the cutter spindle shaft 226 for rotation therewith but free to have relative axial sliding movement therewith. The latter is preferably achieved by using a splined connection between the pinion gear 250 and the cutter spindle shaft. As may be best seen in FIGURE 2, the pinion gear 250 has mounted thereon, the inner race 251 of a self aligning ball bearing assembly 252, the outer race 253 of which is fixed in a bracket 254 fixedly connected to radial arm 34 on the rotor element 30. The bracket 254 could also be an integral extension of radial arm 34. In this manner, the pinion gear 250 is free to rotate with the cutter spindle shaft 226 but it is prevented from having any axial movement. On the other hand, the cutter spindle shaft 226 is free to move axially within the gear 250 when the cutter spindle assembly is reciprocated.

The functioning of the independent drive means now will be described. As the rotor element 30 fixed to main drive shaft 12 rotates, the cutter spindle assembly 210 is revolved bodily about the fixed axis X—X and will carry the pinion gear 250 in an orbit about the drive gear 330 imparting rotative movement thereto causing the rotary cutter disc 26 to rotate with a certain r.p.m., but generally not one of a magnitude sufficient for the purpose of cutting through the article 200. However, by independently driving pulley 331 at a desired r.p.m. an additional r.p.m. may be added to the speed of the pinion gear 250 to bring it up to the intended cutting speed.

In cutting a continuous article moving at a relatively high speed, particularly where the article is of narrow transverse dimension and in many instances of semi-rigid character it is preferable that the article be supported during the actual cutting thereof. For that purpose there is provided the components shown in FIGURES 5, 6 and 7 which include a ledger mechanism 50 and a reciprocating drive assembly 70, the ledger mechanism being adapted to support the continuous article 200 and to hold same to prevent its rotation about its own axis as it is being cut. Those skilled in the art will readily discern that any incipient rotative reaction in the article 200 caused by the passage of the cutter disc 26 therethrough may result in an undesirable spiral cut across the transverse edge of the article or produce a longitudinal speed differential therebetween. The reciprocating drive assembly 70 is used to reciprocate the ledger mechanism 50 in concurrent timed relation with the reciprocating motion of the rotary cutter spindle assembly 210.

Figure 7:
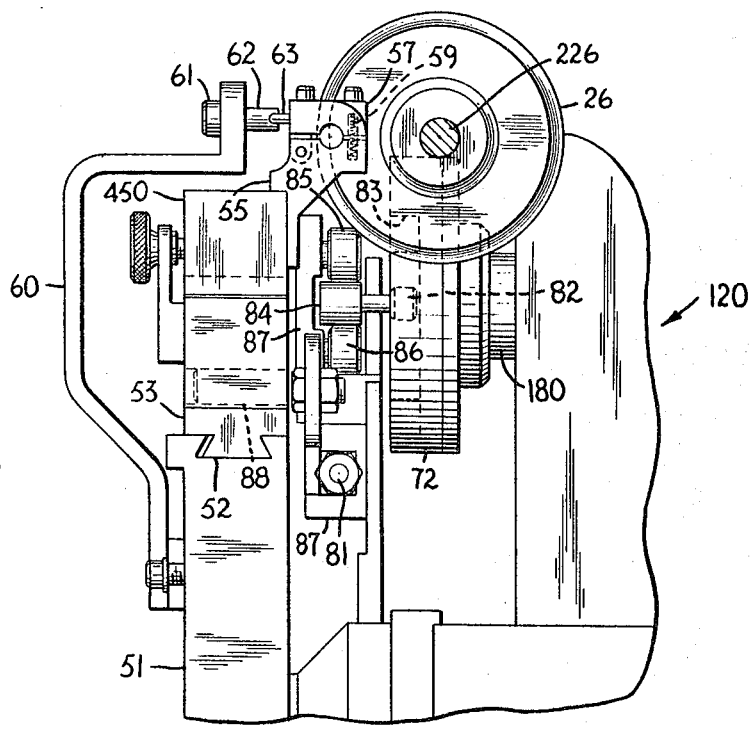
FIGURE 7 is an elevational view of the ledger mechanism and reciprocating drive assembly shown in FIGURE 5 looking in the direction of advance of the article.

Referring now to the construction of the ledger mechanism 50, it includes a mounting bracket 51 fixedly supported on a suitable frame member (not shown) forming part of the overall frame structure of the apparatus of the invention or being of itself an independent frame means. The bracket member 51 has an upper portion which has a smooth machined flat surface wherein is provided a dovetail slot 52. A dovetail block 53 is mounted on the bracket member 51 by means of a dovetailed projection 54 slidably engaged in the dovetail slot 52, with the mounting bracket 51 being positioned such that the dovetail block 53 is slidable parallel with the longitudinal course Y—Y in which the article 200 advances. Fixed to the top of the dovetail block 53 by means of a similar dovetail connection is a ledger block 450. The ledger block 450 is adapted to slide longitudinally as a unit with the dovetail block 53 but it is also adapted to be adjusted transversely towards and away from the article course Y—Y as its dovetail connection is at right angles with that of the dovetail block 53 and mounting bracket 51. The ledger block 450 carries fixed thereto a lower clamp member 55 having a curved groove formed therein as at 56 and to which is pivoted an upper clamp member 57. The upper clamp member 57 is provided with a similar but oppositely oriented groove as at 58 so that when the upper clamp member 57 is pivoted clockwise as seen in FIGURE 7, the grooves 56, 58 define a cylindrical passage concentric with the article course Y—Y and through which the article 200 may advance. The lower clamp member 55 is provided with several compression springs 59 which extend upwardly through suitable slots in the upper clamp member 57 to engage therewith and normally act to bias it in a direction away from the lower clamp member 55 to an open position. With the upper clamp member 57 in an open position, the article 200 will advance through the clamp member being supported in the groove 56 of the lower clamp member 55. On the other hand, when the upper clamp member 57 is in a closed position, the clamp members will engage and firmly hold the article to prevent relative movement therebetween.

An angled, relatively flat bracket member 60 is fixed to the front side of the mounting bracket 51 as seen best in FIGURE 7 and extends upwardly adjacent the ledger block 450 and over the top thereof and is directed inwardly to a location adjacent the clamp members 55, 57. Fixed to the upper part of this bracket member 60 is a stud-like trip arm 61 having fixed thereto a blade spring 62, the blade spring extending closely adjacent the clamp members 55, 57 and being inclined upwardly in the direction of advance of the article. The blade spring 62 functions in conjunction with a rod 63 connected to the upper clamp member 57 to pivot same into a closed position overcoming the biasing effect of the compression springs 59 housed in the lower clamp member 55. The manner in which the spring 62 and rod 63 function will be made more clear later on in the description when describing the operation of the reciprocating assembly 70.

Figure 5:
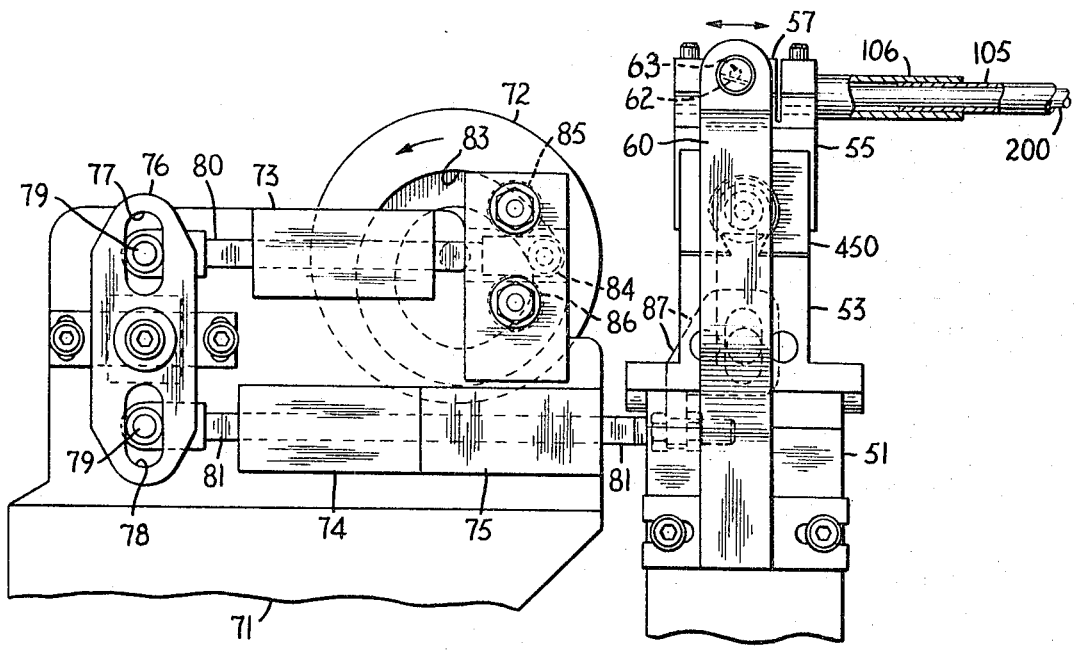
FIGURE 5 is a front elevational view of the ledger mechanism used for holding the article as it is being cut and the reciprocating drive assembly connected therewith for reciprocating the ledger mechanism in unison with the reciprocating movement of the cutter.

The reciprocating assembly 70 is designed to generate and transmit a reciprocating motion to the ledger block 450 in concurrent timed relation with the reciprocating travel of the cutter disc 26. The reciprocating assembly is mounted adjacent the ledger mechanism 50 on a suitable frame 71 and includes a track type cam 72 supported in known manner to rotate about an axis perpendicular to the article course Y—Y. The cam 72 is connected to a drive shaft 180 extending outwardly from the drive unit 120 and driven thereby at the same r.p.m. as the main drive shaft 12. As best seen in FIGURE 5, the frame 71 of the reciprocating assembly extends upwardly a distance adjacent the cam 72 and provides a mounting means for a number of fixed slide blocks 73, 74, 75 as well as a means for supporting a rocker arm 76 for pivoting movement about a fixed axis. The rocker arm 76 is provided with slots 77, 78 at each end for receiving rollers 79 connected with corresponding ends of first and second motion transmitting rods 80 and 81. The first motion transmitting rod 80 is supported slidably in the fixed slide block 73 and is provided at its other end with a follower roller 82 which is engaged in the track 83 of the cam 72, the follower roller 82 extending laterally from a head 84 connected to the end of the rod 80, the head being supported between two guide rollers 85 and 86 mounted in a suitable block 87 fixed to frame 71 in front of the cam. As the cam 72 is rotated, the follower roller 82 in following the track 83 therein will impart a reciprocating travel to the rod 80 of one cycle each time the cam rotates. This reciprocating motion in the rod 80 is transmitted in an opposite direction by means of the rocker arm 76 to the second rod 81 which is supported for sliding movement within the fixed slide blocks 74 and 75, and which at its other end is connected with a lower slide assembly 87 as best seen in FIGURE 7. The lower slide assembly 87 in turn is fixed by means of a stud fastener 88 with the dovetail block 53. In this manner, the dovetail block 53 and hence ledger block 450 and upper and lower clamp members 55, 57 are reciprocated concurrently with the reciprocating motion of the cutter disc 26.

The track 83 of cam 82 is designed to impart reciprocating motion to the dovetail block 53 in a manner such that its movement duplicates that of the rotary cutter disc 26 at least during that portion of the advance stroke of the reciprocating cycle when the rotary cutter disc 26 is in actual cutting contact with the article 200. It will be understood that the "advance stroke" of the cycle means when rod 81 is travelling to the left in FIGURE 5. To that end, the track 83 which constitutes the profile of the cam has a section thereon specially designed to impart to the dovetail block 450 during said portion of the advance stroke a uniform speed which is equal to the speed at which the article is advancing and which is similarly equal to the speed of advance of the rotary cutter disc 26.

The reciprocating motion of the clamp members 55, 57 serves to cooperate with the blade spring 62 to open and close the clamping means in the manner which will now be described. It will be noted that the blade spring 62 is inclined upwardly in the direction in which the article advances. Thus, as the clamping members 55, 57 are reciprocated in the forward stroke travel to the left as shown in FIGURE 5, the rod 63 connected with the upper clamp member 57 which is positioned to engage and disengage the blade spring will ride up the upper face of the blade spring 62, its vertical positioning changing accordingly. The reaction force of that movement of the rod will apply a force couple to the upper clamp member 57 biasing it clockwise as seen in FIGURE 7, to swing it to a closed position by overcoming the counter-clockwise biasing effect of the springs 59. This force couple will remain applied until the rod nears the end of its travel on the upper face of the blade spring. The blade spring 62 is positioned such that the upper clamp member 57 will not fully close so as to clamp tightly the article 200 until the rod 63 has travelled along the upper face of the spring to a point corresponding to that at which the speed of the clamp members 55, 57 become uniform and equal to that of the article as described above. Just prior to the end of the advance travel of the clamp members, and at a point when the rod 63 can not move vertically upwardly due to the upper clamp member 57 being fully closed, the blade spring 62 will deflect to permit the rod 63 to pass to the underface of the spring so that during the return stroke of the reciprocating cycle, the rod 63 will ride down at the underface of the spring 62, the force couple on the upper clamp member 57 is now removed and the compression springs 59 swing the upper clamp counter-clockwise opening the upper clamp member 57. Thus, it will be seen that during the uniform speed portion of the forward stroke of the reciprocating cycle, the clamp members 55, 57 are in clamping position on the article 200 and hold it against rotation, as it is during this portion of the forward stroke that the rotary cutter will cut the article.

Figure 6:
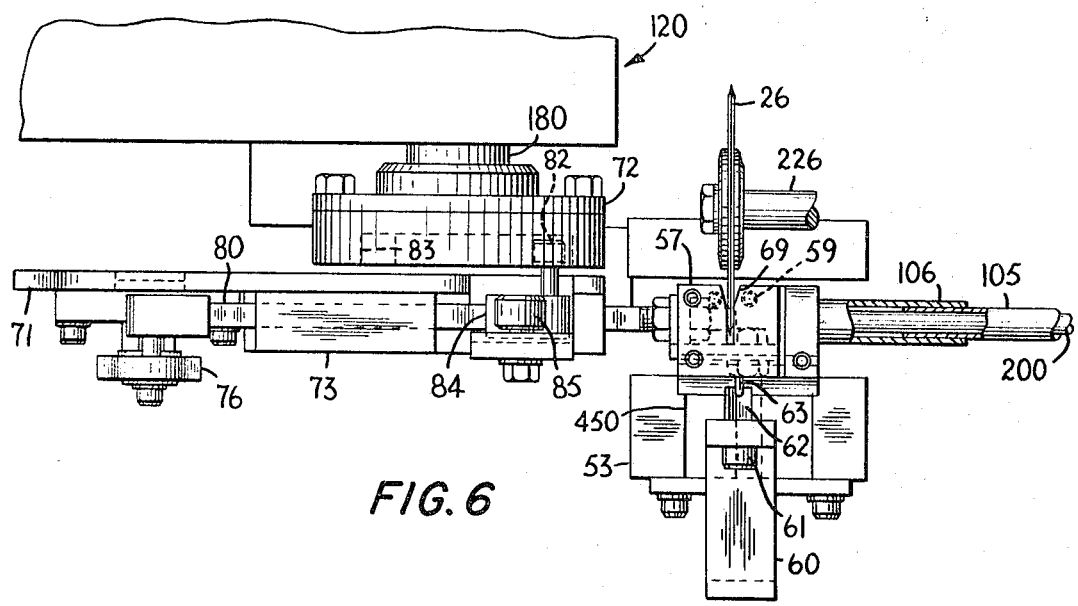
FIGURE 6 is a top plane view of the ledger mechanism and reciprocating drive assembly shown in FIGURE 5.

As seen in FIGURE 6, the upper and lower clamping members 55, 57 are slotted as at 69 to provide an opening through which the rotary cutter disc 26 passes in its travel into and out of cutting contact with the article.

For convenience of providing maximum support to the article as it advances through the apparatus, a guide tube 105 may be supported adjacent the ledger mechanism as shown in FIGURE 6, the rod being delivered from the forming machinery through the tube 105 which is concentric with the opening formed by the grooves 56, 58 in the upper and lower clamps and which may be enclosed in a telescoping outer tube 106 fixed to the ledger mechanism.

FIGURE 8 represents a diagram of the cam profile of the cam 20 used for reciprocating the cutter spindle assembly 210. The segment A—A thereon is that used to impart sliding travel to the cutter spindle assembly during the return stroke of the reciprocating cycle, that is to say, the sliding travel of the assembly to the right as seen in FIGURE 2. The segment B—B imparts sliding travel to the assembly in the opposite or forward stroke direction during which travel of the actual cutting of the article 200 takes place. The lesser profile segment C—C included in section B—B is that which imparts a uniform speed of travel to the rotary cutter which is equal with that of the uniform speed at which the article is advancing. Segment D—D is a dwell period.

The concurrent movement of the ledger mechanism 50 is produced by means of the cam 72 the profile of which is shown in FIGURE 9. From FIGURE 9 it will be noted that the profile segment E—E is used to slide the ledger mechanism 50 to the right as seen in FIGURE 5, the return stroke of the reciprocating cycle. On the other hand, the segment F—F provides the advance stroke travel and the lesser segment G—G therein imparts uniform speed to the ledger mechanism which is equal to that of the advancing article during the time that the article is actually being cut. H—H is a dwell period.

Thus, it may be seen that the apparatus of the present invention provides for a novel motion of the various components thereof which is such that the speed of the advancing article 200, the rotary cutter disc 26 and the ledger mechanism 50 are all equal for that portion thereof when the article is actually being cut. This feature may be best appreciated by referring to FIGURE 10 which illustrates graphically the speed of the rotary cutter disc 26 and the ledger mechanism for one complete reciprocating cycle. Since the cams 20 and 72 each rotate at the same r.p.m., speed is plotted against revolutions for each. It will be seen from FIGURE 10 that the rotary cutter disc and ledger mechanism each have at the time of actual cutting of the rod, equal speeds as denoted by the bracket section M—M which in turn are equal to the article speed.

Various other changes and different embodiments of the apparatus could be made within the principles described or indicated in the foregoing, and it is intended that all matter set out therein or shown in the accompanying drawings shall be interpreted as illustrative and not in a limiting sense.

We claim:

1. In apparatus for cutting an article of continuous length advancing in a fixed longitudinal course at a uniform speed into sections or predetermined length, a shaft having an axis of rotation parallel to said longitudinal course, a cutter disc carried by said shaft and adapted to rotate therewith in a plane transverse to said lonitudinal course, another shaft rotatable about a fixed axis parallel spaced from said longitudinal course, a rotor element mounted on said other shaft for rotation therewith and having radial arms thereon, the first-mentioned shaft being mounted rotatably in one of said arms, means rotating said other shaft one revolution each time said article advances a distance equal to the length of the sections being cut therefrom, said first-mentioned shaft revolving bodily about said fixed axis when said other shaft is rotated, the path of revolution of said first-mentioned shaft passing adjacent said longitudinal course with said cutter disc passing into and out of cutting contact with said article each time said other shaft is rotated, a cam concentric with said fixed axis and having a profile extending circularly thereof, said profile varying longitudinally of said fixed axis to adapt said cam for transmitting a reciprocating motion parallel to said fixed axis, a follower means connected with said first-mentioned shaft and engaging the profile of said cam whereby said first-mentioned shaft is reciprocated longitudinally of said course simultaneously with each revolution of said other shaft about said fixed axis, said cutter disc being in contact with said article during a portion only of the advance stroke of the reciprocating cycle, said cam profile having a section thereon imparting a longitudinal speed to said shaft during at least said portion of the advance stroke of said cycle which is equal to the speed of advance of said article.

2. Apparatus as set forth in claim 1 further comprising drive means connected with said first-mentioned shaft for rotating it about its own axis.

3. Apparatus as set forth in claim 2 wherein said drive means comprises a pinion gear mounted on said first-mentioned shaft for rotation therewith, and a drive gear mounted on said other shaft and meshing with said pinion gear.

4. Apparatus as set forth in claim 3 wherein said pinion gear is mounted on said first-mentioned shaft for relative axial movement therewith.

5. Apparatus as set forth in claim 3 wherein said drive gear is loosely mounted on said other shaft, a pulley loosely mounted on said other shaft and fixed to said drive gear, and means rotating said pulley independently of the rotation of said other shaft.

6. Apparatus as set forth in claim 1 wherein one of the radial arms of said rotor element is provided with a slotted portion extending parallel to said other shaft and constituting a slideway and a housing supporting in said slotted portion for sliding movement therein, said first-mentioned shaft being mounted rotatably in said housing.

7. Apparatus in accordance with claim 6 wherein said cam is a fixed ribbon cam, the ribbon having parallel spaced faces constituting the cam profile, and said follower means comprises rollers mounted on said sleeve and contacting each of said faces.

8. Apparatus as set forth in claim 1 further comprising clamp means operable to hold said article as it is being cut, and means reciprocating said clamp means longitudinally of said longitudinal course in concurrent timed relation with the reciprocating motor of said rotary cutter, said clamp means comprising a ledger block supported slidably adjacent said longitudinal course, a lower clamp member fixed to said ledger block and having a groove therein supportingly receiving said article, an upper clamp member pivoted to said lower clamp, means normally biasing said upper clamp member in a direction away from said lower clamp member, said ledger block being operatively connected with said reciprocating means, a rod fixed to said upper clamp member, and resilient means engaging said rod during the advance stroke of the reciprocating cycle of said ledger block to pivot said upper clamp member towards said lower clamp member and into clamping engagement with said article to hold same as it is being cut.

9. Apparatus as set forth in claim 8 wherein said means reciprocating said clamp means comprises a cam adapted to rotate about a fixed axis transverse to said longitudinal course and having a track profile therein, a rocker arm pivoted intermediate its ends on an axis parallel to the axis of rotation of said cam, a cam follower contacting the track profile of said cam, a first motion transmitting rod connected with said cam follower and one end of said rocker arm, and a second motion transmitting rod connected with the other end of said rocker arm and with said clamp means.

10. Apparatus as set forth in claim 8 wherein the resilient means engaging the rod fixed to said upper clamp member comprises a leaf spring fixedly inclined upwardly in the direction of the advance stroke of said ledger block, said rod engaging with and riding upwardly on the upper face of said leaf spring during said advance stroke, said spring being yieldable to permit said rod at the end of said advance stroke to pass on to the underface of said leaf spring, said rod riding downwardly at the underface of said leaf spring during the return stroke of said ledger block whereby said biasing means urge said upper clamp member in a direction away from said lower clamp member.

11. Apparatus as set forth in claim 8 wherein said biasing means comprises compression springs supported in said lower clamp member and engaging said upper clamp member.

References Cited

UNITED STATES PATENTS

| 3,044,336 | 7/1962 | Bock | 83—488 X |
|---|---|---|---|
| 3,164,048 | 1/1965 | Wray | 83—338 X |
| 3,241,413 | 3/1966 | Erdmann | 83—338 X |

WILLIAM S. LAWSON, *Primary Examiner.*

UNITED STATES PATENT OFFICE

CERTIFICATE OF CORRECTION

Patent No. 3,380,331                          April 30, 1968

Floyd G. Boothe, Jr., et al.

It is certified that error appears in the above identified patent and that said Letters Patent are hereby corrected as shown below:

Column 10, line 3, "slideway and a housing supporting" should read -- slideways, and a housing supported --; line 15, "motor" should read -- motion --.

Signed and sealed this 7th day of October 1969.

(SEAL)
Attest:

Edward M. Fletcher, Jr.
Attesting Officer

WILLIAM E. SCHUYLER, JR.
Commissioner of Patents